Patented Feb. 24, 1953

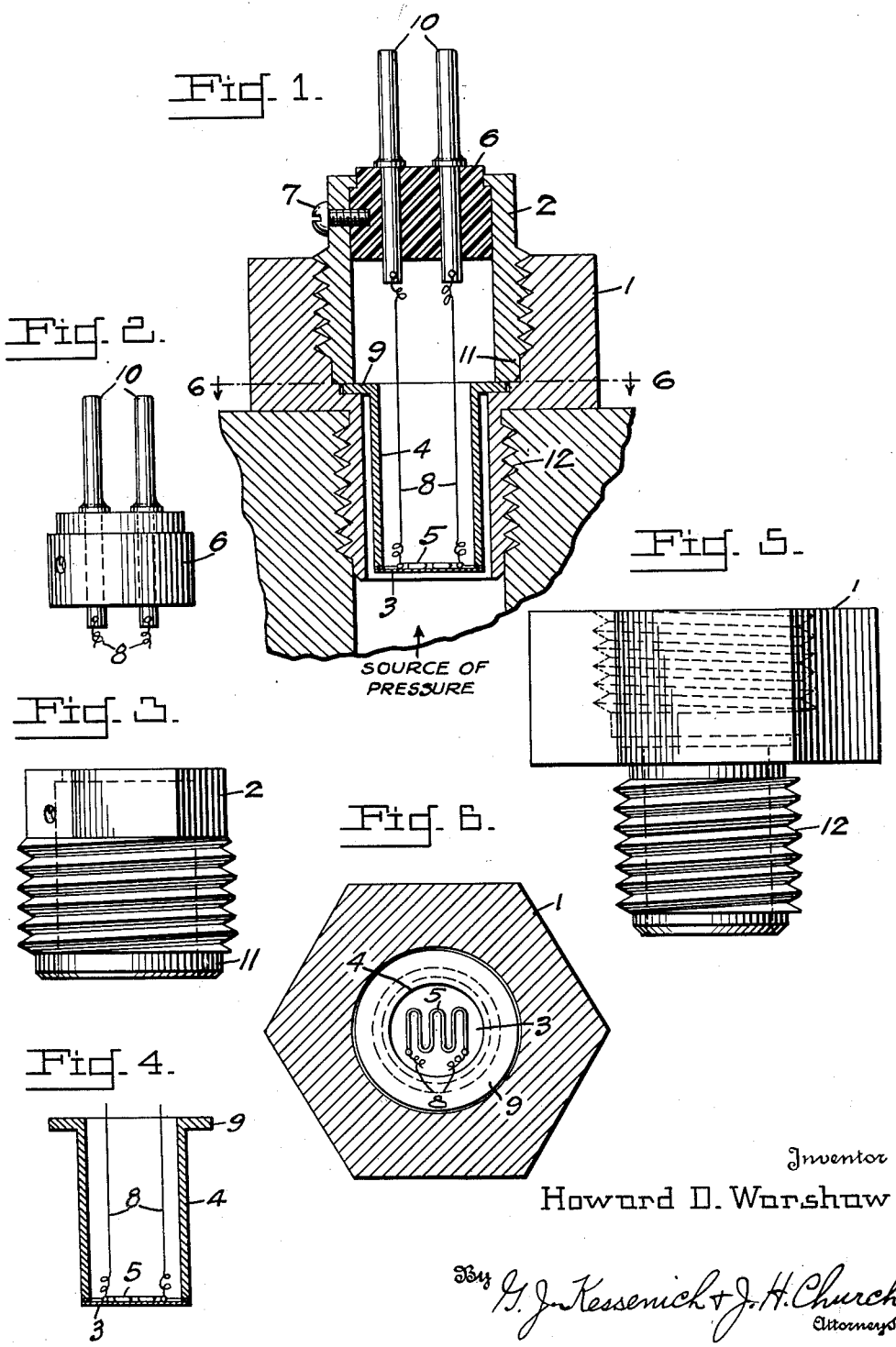

2,629,801

UNITED STATES PATENT OFFICE 2,629,801

MOUNTING FOR PRESSURE RESPONSIVE DEVICE

Howard D. Warshaw, Drexel Hill, Pa., assignor to the United States of America, as represented by the Secretary of the Army Application August 1, 1950, Serial No. 177,036

1 Claim. (Cl. 201—63)

This invention relates generally to pressure responsive devices and more particularly to a means or method of mounting a strain gage when the said strain gage is used for measurement of short duration or rapidly varying pressures in gages and liquids.

It is an object of this invention to provide a novel, improved mounting for a strain gage.

It is a further object of this invention to mount or support a diaphragm type strain gage in a housing in such a way that it is free from any stress which might be imparted to the said housing by the pressure being measured.

In carrying out the above objects a diaphragm type strain gage is used. The diaphragm gage consists of a filament of wire, the electrical resistance of which varies in accordance with the strain therein, adhesively secured to a diaphragm whereby deformation of the said diaphragm are transmitted to the said filament to thereby vary its electrical resistance, which resistance change is measured by any conventional means. The diaphragm in the prior art is snugly fitted to a housing, which is secured to or connected with the pressure chamber. It is obvious that upon application of pressure to the conventional housing a certain degree of physical distortion of the housing will follow which will be transmitted to the filament carrying diaphragm and will result in a reading that is not wholly accurate. This is not too important when the pressure to be explored remains at a constant value sufficiently long for the instrument to be calibrated for errors in the housing or mounting, but when the pressure is fluctuating or is suddenly applied and of short duration (for example the pressure is a gun barrel during the travel of the bullet through said barrel) it is difficult if not impossible to determine and correct for errors introduced by the diaphragm mounting distortion.

My solution to this problem contemplates the mounting of the diaphragm type strain gage within a housing in such a way that the diaphragm support is physically separated from the main housing and stresses in the housing will not be transmitted to the said diaphragm.

Fig. 1 is a longitudinal section of the novel assembly in accordance with my invention.

Fig. 2 is an elevation of a connector plug used in my invention.

Fig. 3 is an elevation of a threaded bushing used in my invention.

Fig. 4 is a longitudinal section of a strain gage sub-assembly used in my invention.

Fig. 5 is an elevation of a fitting used in my invention.

Fig. 6 is a cross section on lines 6—6 of Fig. 1.

Referring to Fig. 1, a conventional diaphragm 3 of preferably circular form is cemented along its edges to the lower rim of hollow cylinder 4. The diaphragm has adhesively bonded thereto wire filaments 5 which are suitably shaped as may be desired but are shown as reversely bent and have secured thereto leads 8. The leads 8 are connected by soldering or other suitable means to prongs 10 adapted for cooperation with a female plug (not shown).

The cylinder or tube 4 has one end closed by the diaphragm 3 and the other end open. The turned out rim 9 formed on the open end of the cylinder 4 is adapted to seat upon a shoulder in fitting 1 and the body of the said cylinder extends within threaded boss 12 as can be seen from Fig. 1. The threaded bushing 2 has a hexagonal crown formed on one end thereof for cooperation with a wrench or the like and an integral sleeve or collar 11 on the other end. When the bushing 2 is threadedly engaged with the member 1 the flange 9 is clamped between the shoulder of threaded mounting member 1 and the sleeve 11 of bushing 2. Since the outside diameter of cylinder 4 is less than the inside diameter of the threaded boss 12 of fitting 1 there is an annular clearance between the diaphragm supporting cylinder and the inside of the boss. The clearance is made small by a careful choice of diameters to avoid disturbance of the gas or liquid during measurement.

The connector plug 6 is made of any suitable thermoplastic insulating material and the prongs 10 are molded therein. The plug may be secured within the bushing 2 by any well known means but I have found it convenient to use one or more set screws 7 passing through the crown wall of bushing 2 and into the body of the said plug.

The assembly of Fig. 1 is screwed into the chamber that is to be explored. It will be apparent from the foregoing description that the diaphragm supporting cylinder or tube is separated from the main housing and is connected thereto only by flange 9. Because of this separation the stresses induced in the housing mounting threads by the pressure being measured will not be transmitted to the diaphragm.

My invention permits the use of standard inexpensive commercial materials in body members 1 and 2, and special alloys, for example Invar, having desirable temperature characteristics in the diaphragm support cylinder 4, thereby reducing the cost of the assembly and at the same time permitting an accurate calibration of those parts from which the readings are directly taken.

It will of course be understood that various changes in details of construction and arrangement of parts may be made by those skilled in the art without departing from the spirit of the invention as set forth in the appended claim.

I claim:

A pressure responsive device comprising a fitting having a hollow exteriorly threaded boss and an interiorly threaded body portion, an exteriorly threaded bushing adapted for engagement with said body portion and having a sleeve at one end thereof, a hollow cylinder of smaller diameter than the inside diameter of said boss having a turned out flange at one end and a diaphragm closing the other end, wires bonded to said diaphragm and having leads therefrom, a plug member within a portion of said bushing and electrically connected to said leads, said cylinder disposed within said boss and securely retained therein by clamping engagement between said sleeve and said flange.

HOWARD D. WARSHAW.

REFERENCES CITED

The following references are of record in the file of this patent:

UNITED STATES PATENTS

| Number | Name | Date |
|---|---|---|
| 2,421,907 | Postlewaite | June 10, 1947 |
| 2,472,045 | Gibbons | May 31, 1949 |
| 2,472,047 | Ruge | May 31, 1949 |
| 2,515,867 | Fuller | July 18, 1950 |